C. J. PRANKARD, Jr.
COLLAR FOLDING AND SHAPING MACHINE.
APPLICATION FILED SEPT. 10, 1908.

1,166,783.

Patented Jan. 4, 1916.
10 SHEETS—SHEET 1.

Fig. 1.

C. J. PRANKARD, Jr.
COLLAR FOLDING AND SHAPING MACHINE.
APPLICATION FILED SEPT. 10, 1908.

1,166,783.

Patented Jan. 4, 1916.
10 SHEETS—SHEET 2.

Fig. 2.

C. J. PRANKARD, Jr.
COLLAR FOLDING AND SHAPING MACHINE.
APPLICATION FILED SEPT. 10, 1908.

1,166,783.

Patented Jan. 4, 1916.
10 SHEETS—SHEET 6.

C. J. PRANKARD, Jr.
COLLAR FOLDING AND SHAPING MACHINE.
APPLICATION FILED SEPT. 10, 1908.

1,166,783.

Patented Jan. 4, 1916.
10 SHEETS—SHEET 7.

Fig. 7.

C. J. PRANKARD, Jr.
COLLAR FOLDING AND SHAPING MACHINE.
APPLICATION FILED SEPT. 10, 1908.

1,166,783.

Patented Jan. 4, 1916.
10 SHEETS—SHEET 9.

C. J. PRANKARD, Jr.
COLLAR FOLDING AND SHAPING MACHINE.
APPLICATION FILED SEPT. 10, 1908.

1,166,783.

Patented Jan. 4, 1916.
10 SHEETS—SHEET 10.

UNITED STATES PATENT OFFICE.

CHARLES J. PRANKARD, JR., OF TROY, NEW YORK.

COLLAR FOLDING AND SHAPING MACHINE.

1,166,783.  Specification of Letters Patent.  Patented Jan. 4, 1916.

Application filed September 10, 1908. Serial No. 452,423.

*To all whom it may concern:*

Be it known that I, CHARLES J. PRANKARD, Jr., a citizen of the United States, residing at Troy, in the county of Rensselaer and State of New York, have invented certain new and useful Improvements in Collar Folding and Shaping Machines, of which the following is a specification.

This invention relates to improvements in machines for edge ironing, folding, and shaping collars.

The object of the invention is to provide heated mechanism for folding the collars, combined with a guiding chamber, in combination with intermediate and final folding mechanism to set the shape of the collar.

Another important object of this invention is to provide final folding mechanism in such manner that the collar after leaving the guiding chamber is in constant contact with movable parts to assist in setting the fold to make the contour of the collar substantially concentric.

Other objects and advantages will be hereinafter referred to and particularly pointed out in the claims.

In the drawings: Fig. 8 is a vertical section on the line 8—8 Fig. 3. Fig. 8ª is a detail perspective view of the adjustable support which regulates the downward pressure of the iron.

1, represents a bed-plate mounted on legs 2.

3, represents a vertical shaft mounted in bearings in the bed-plate and a supplemental frame 1ª located under the latter and carrying preferably a metal roll 4, which is slightly tapered, and formed near its upper end with a shoulder or bead 5. A shaft 7, is mounted alongside the shaft 3, and its lower end is mounted in a bearing in the supplemental frame 1ª, and passes through a slot 8, in the bed-plate, and a bearing 9, just above the bed-plate. The bearing 9, is attached to a lever 10, pivoted at 11, to the bed-plate and is adapted to be moved toward and from the metal roll 4, and is held away from said roll by being engaged behind a pin 12. The shaft 7, also has a bearing in one end of an arm 13, pivoted at 14, to the underside of the bed-plate, and a coiled spring 15, engages with said bearing to normally force the shaft 7, toward the roll 4. A set screw 16, engages the opposite end of the spring and operates in a threaded opening in the bed-plate, to increase or decrease the pressure on the collar as it is being preliminarily folded.

A slightly tapered roll 17, is mounted on the upper end of the shaft 7, and coöperates with the roll 4, to preliminarily fold the collars, the periphery of said roll being padded as at 18. The hub at the lower end of the roll 17 is provided with a hook 19, adapted to engage a pin 20, extending from the shaft 7, to transmit motion to the roll, and at the same time make the latter detachable should occasion require to repad or repair the surface. The tapered roll 17, is shorter than roll 4, and coöperates with the shoulder or bead 5, the diameter of the two rolls and the speed being different for a purpose to be hereinafter described.

A stationary vertically disposed main guide 22, is located adjacent the roll 4, and tangentially thereto, and is adapted to receive the collar to direct the latter between rolls 4, and 17. The main guide 22, is formed with a base having slots 23, which receive adjusting screws 24, to properly position the guide with reference to the peripheries of the rolls 4 and 17. The upper edge of the guide is rounded, and is tangential to the roll 4. The guide is nearer in line with the center of the roll 17, than roll 4, so that when a collar is directed between said rolls, its front edge will first contact with roll 4, and upon continued movement it will strike against the periphery of roll 17, and as the latter is moving toward roll 4, the collar will be carried in, and gripped to form the preliminary fold.

Figure 1:
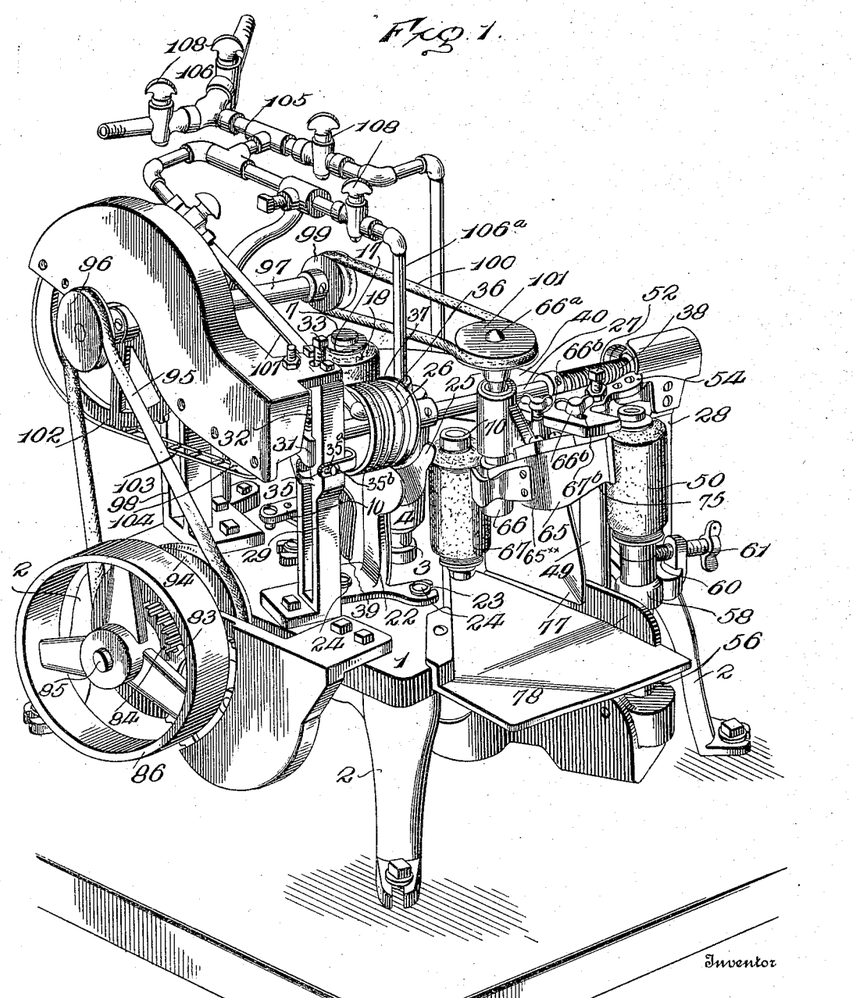
Figure 1 is a perspective view of my improved machine.
Figure 2:
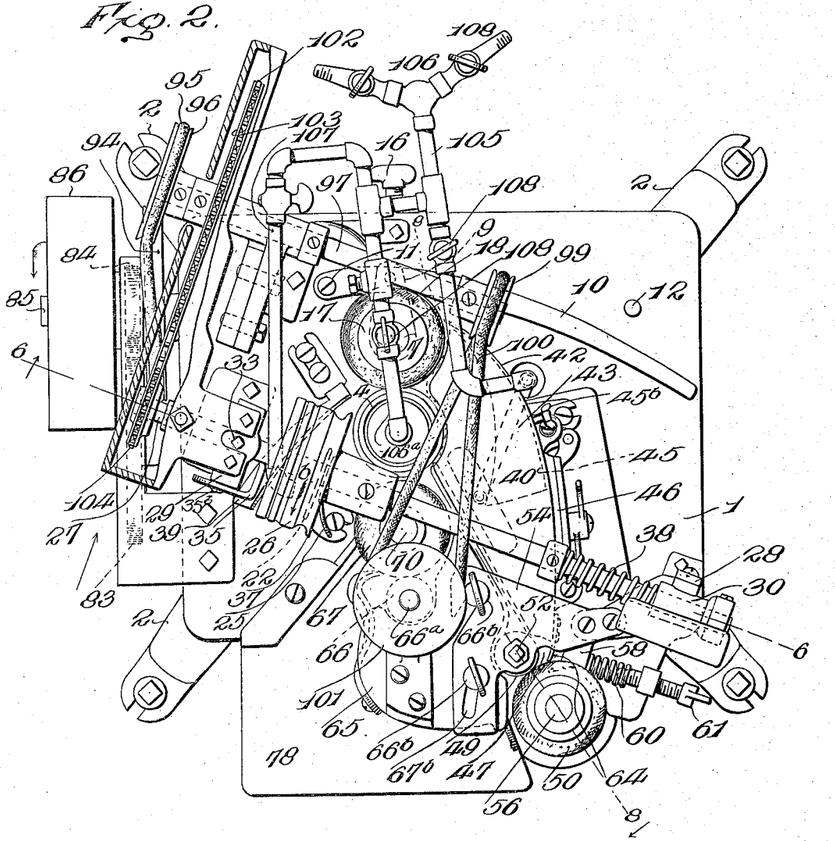
Fig. 2 is a top plan view of the same.
Figure 3:
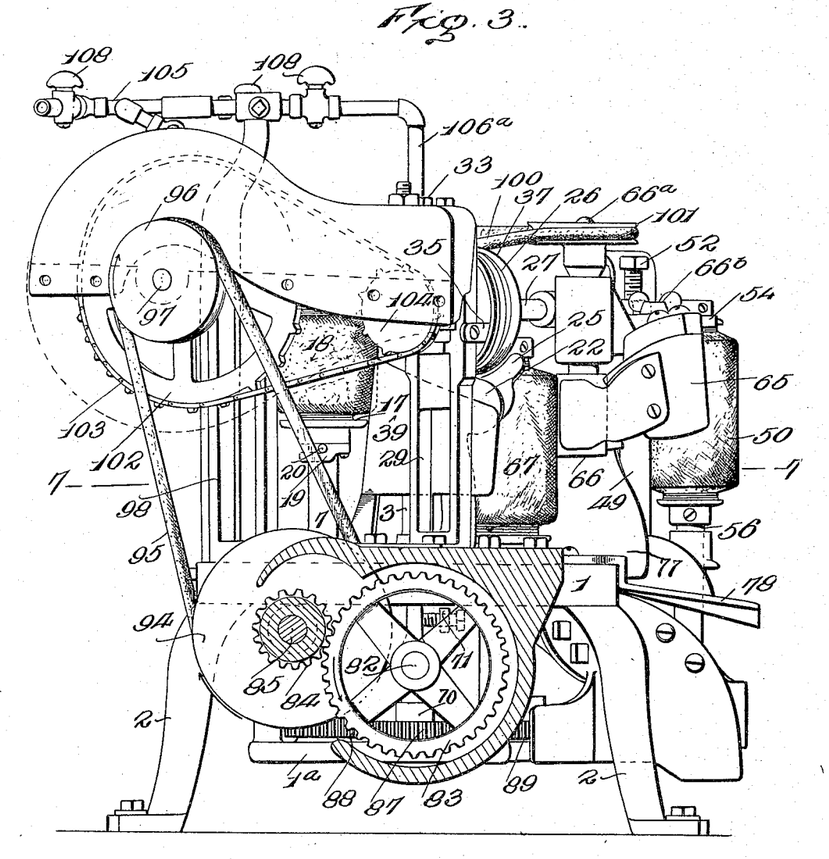
Fig. 3 is a side elevation, a part of the frame being in section.
Figure 4:
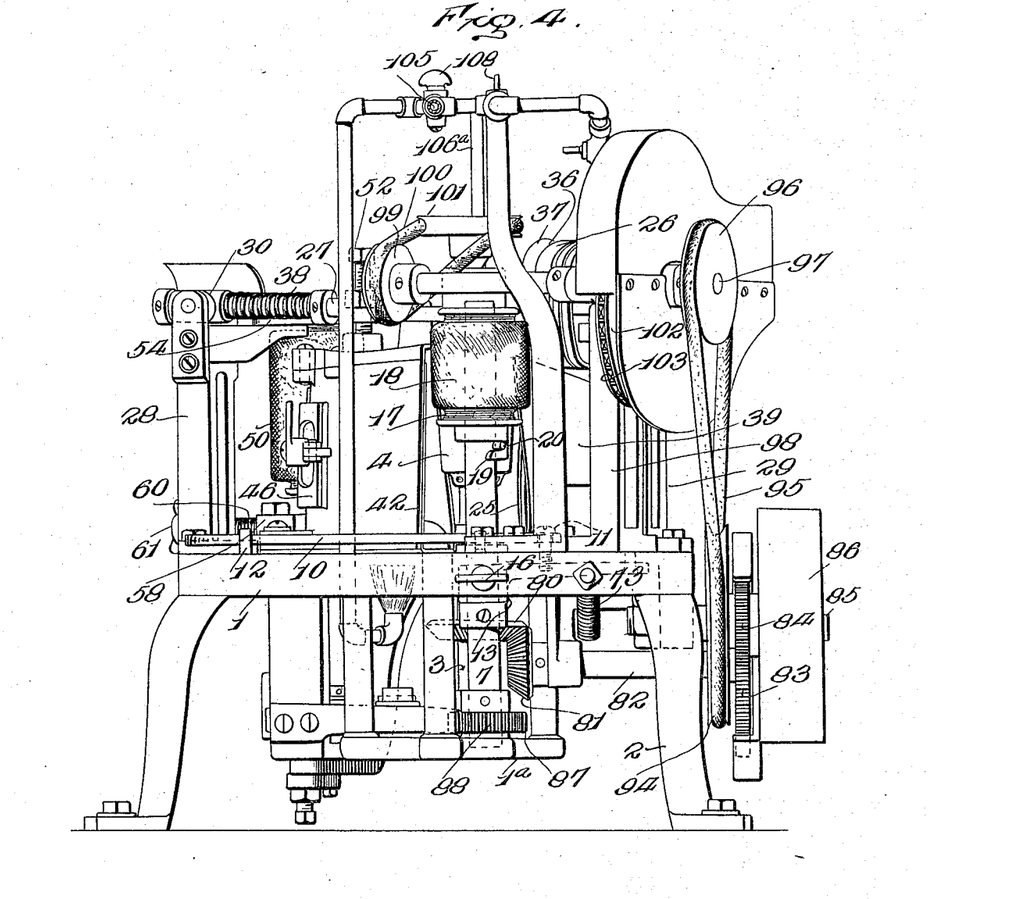
Fig. 4 is a rear view.
Figure 5:
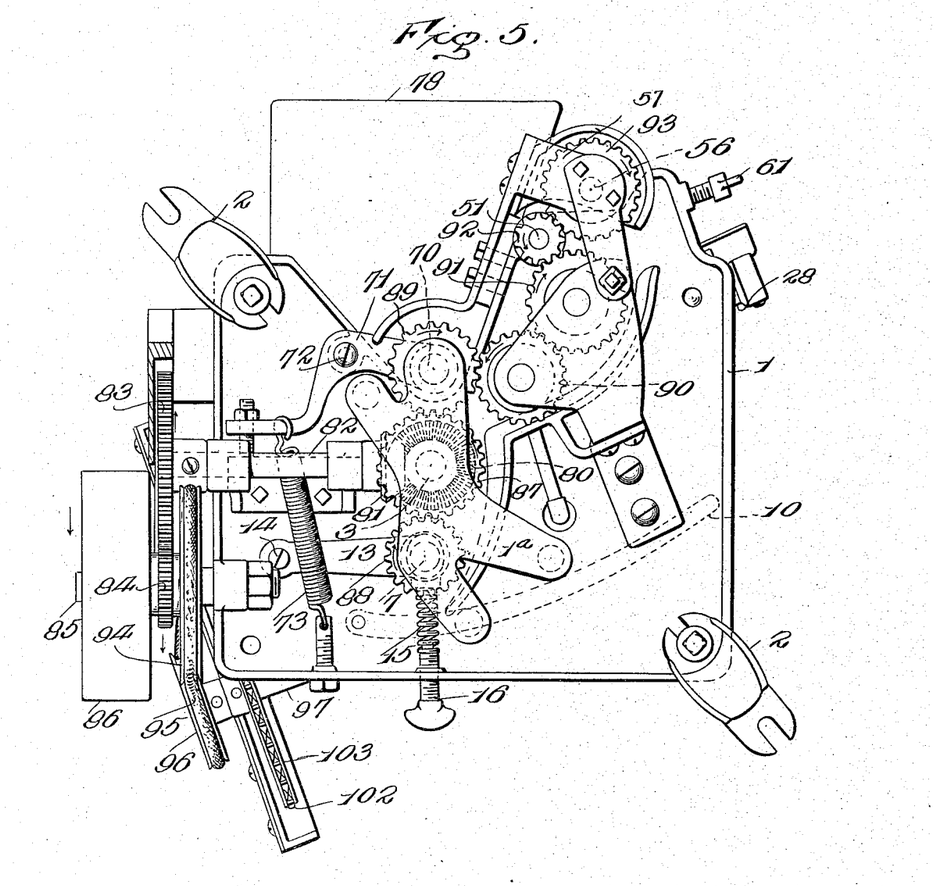
Fig. 5 is a bottom plan view.
Figure 6:
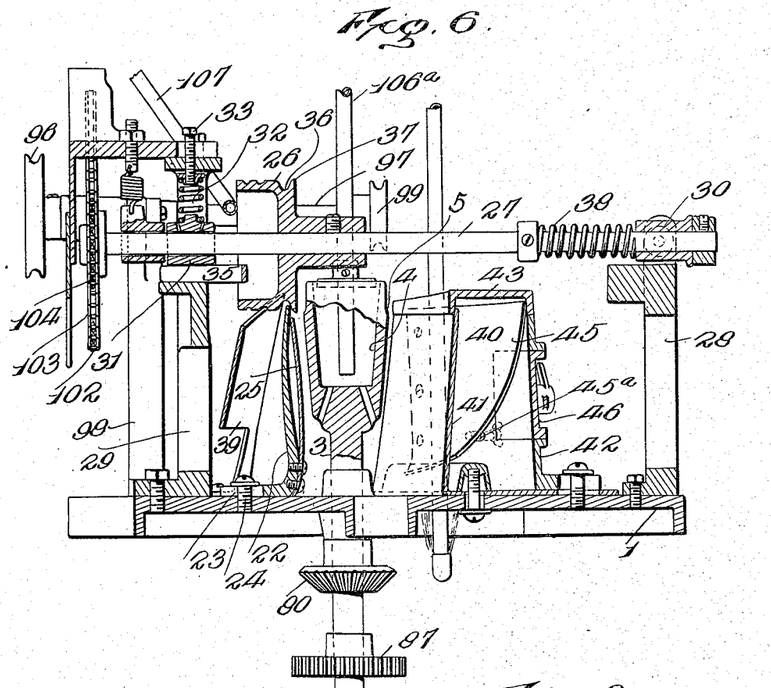
Fig. 6 is a section on the line 6—6 Fig. 2.
Figure 7:
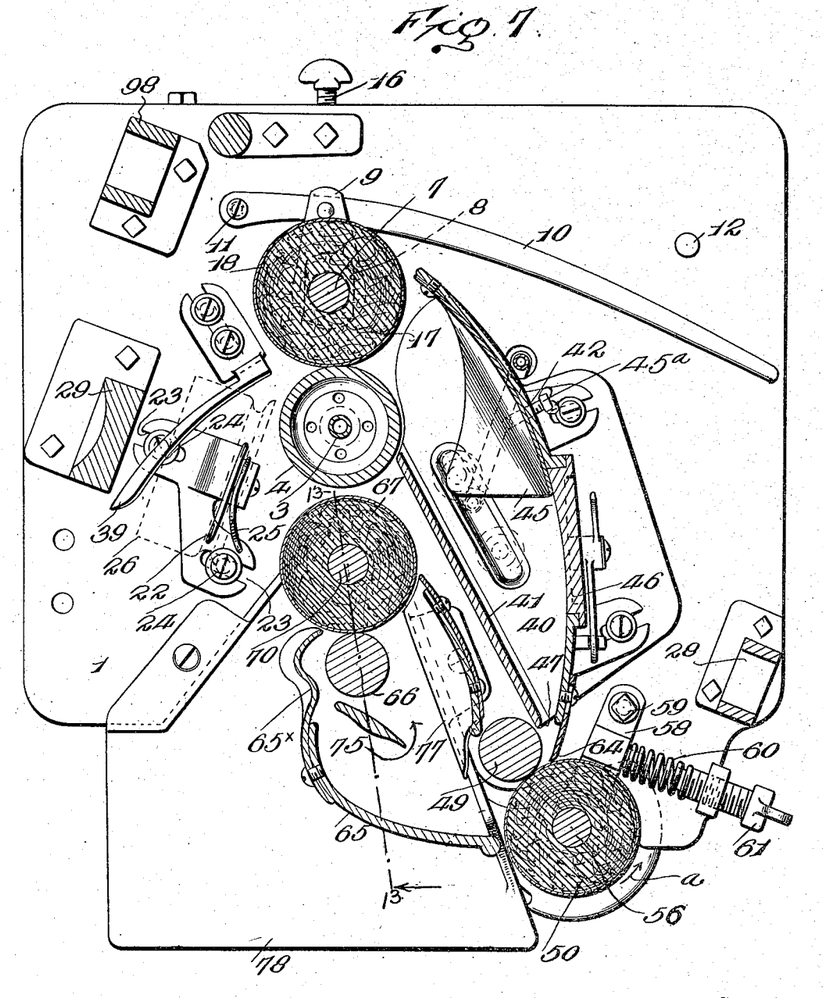
Fig. 7 is a horizontal section on the line 7—7 Fig. 3.

A spring member 25, is secured to the inner side of the guide 22, and its upper end normally impinges the guide to hold the band of the collar flat to keep it in erect position. The front end of the spring member flares outwardly and has an extension to form a mouth to receive the band of the collar as clearly shown in Fig. 7.

Coöperating with the upper edge of the vertically disposed main guide is a hollow revolving iron 26, for ironing the top edge of the folded collar, said iron being mounted on a shaft 27, supported in standards 28 and 29. The standard 28, has mounted in it a transversely pivoted bearing 30, which receives one end of the shaft 27. The standard 29, is slotted at its upper end to receive a movable bearing block 31, in which the other end of the shaft 27, is mounted. A spring 32, bears on one end of the block 31, and is engaged by a set screw 33, to regulate the downward pressure of the iron on the guide 22, and an adjustable support 35, is interposed between the block and the standard to limit the downward movement of the iron to prevent crushing the collar. The support is of V-form and is provided with a slot 35$^a$, through which an adjusting screw 35$^b$ passes to set and hold the support rigid to the standard 29. When the support is tilted it raises or lowers the shaft 27, and when set in position by the screw 35$^b$ it limits the downward movement of the revolving iron with reference to the top of the guide 22. The iron 26, as previously stated, is mounted on the shaft 27, and is formed with a groove 36, and a flange 37, to fit the edge of the vertical guide 22. Interposed between the pivoted bearing 28, and a collar on the shaft 27, is a coiled spring 38, for the purpose of forcing the flange 37, against the inner side of the guide so that the complete folded edge of the collar will be ironed. When a collar is inserted under the iron 26, the latter is raised against the tension of the spring 32, the thickness of the collar, and at the same time it is also moved laterally against the tension of the spring 38, thus creating a pressure downwardly and laterally on the collar fold. The flange 37, on the iron under these conditions very materially assists in forming or shaping the beginning of the fold preparatory to its introduction between the rolls 4 and 17.

Coöperating with the guide 22, and rolls 4 and 17, is a supplemental guide or deflector 39, which inclines toward roll 4, and curves at its inner end toward the opening between said roll and roll 17. The function of this supplemental guide is to gradually force the outer band of the collar against the inner band so that the two rolls 4 and 17, will uniformly take hold of the upper edge of the collar, to assist in preventing the latter buckling as so frequently happens with machines of this type. The supplemental guide 39, is located at an angle to the vertically disposed guide 22, to conveniently permit of the introduction of the collar in its flattened condition in advance of the iron.

Adjacent the rolls 4 and 17, is a combined guiding and drying chamber 40, formed of two members 41 and 42, and a top 43. The member 41, is bent at its lower end to form a base which extends laterally under the member 42, and its vertical wall terminates adjacent the roll 4, while the top is cut out to fit around the two rolls 4 and 17, the end of the member 42, terminating adjacent the roll 17. The member 42, is provided with lugs at its lower edge, formed with slots to receive bolts passing into threaded openings in the bed-plate to permit adjustment. The bed-plate is formed with an opening directly under the guiding chamber, by means of which the combined guiding and drying chamber is heated. On the inner side of the member 42, is a deflector 45, adjustable by a screw 45$^a$ and having a slight spiral bend in it, against which the outer band of the collar contacts so as to insure throwing the end toward the top of the guiding chamber as the collar is passing between the rolls 4 and 17, and just in advance of this deflector is a door 46, having a latch, whereby access to the guiding chamber may be had should occasion require. The outer end of the guiding chamber converges toward the front end to form a contracted exit opening 47, so that in case the collar opens up as it frequently does after having passed the deflector, the converging formation will draw the bands together to pass between what I shall term intermediate folding and curling rolls 49 and 50.

Located adjacent the opening 47, is a small slightly tapered and beaded roll 49, the inner face of the member 41, being tangent to the said roll, and fitting close up to the same. The roll 49, is mounted on a shaft 51, held at its upper end by a set screw 52, passing through a bracket 54, mounted on the upper end of the standard 28. The lower end of the shaft 51, has a bearing in an arm extending downwardly from the bed-plate 1. Adjacent the roller 49, and contacting therewith is a much larger and slightly tapered roll 50, mounted on a shaft 56, having a bearing in a support 57, on the underside of the bed plate, and a bearing 58, the latter being pivoted to the upper side of the bed-plate at 59. A spring 60, bears against the bearing 58, and a set screw 61, engages the opposite end of the spring to regulate the tension of the same, that pressure of the roll 50, against the roll 49, may be regulated. The roll 50, is located directly in front of the reduced end 47 of the guiding chamber and travels toward the roller 49, in direction of arrow $a$ so that as the tab of the collar contacts with it (roll 50) it moves said collar toward roller 49, and is gripped between the pair of rollers and is being pulled from the guiding chamber, before the rear end is free of the rolls 4 and 17.

Figures 8, 8A:
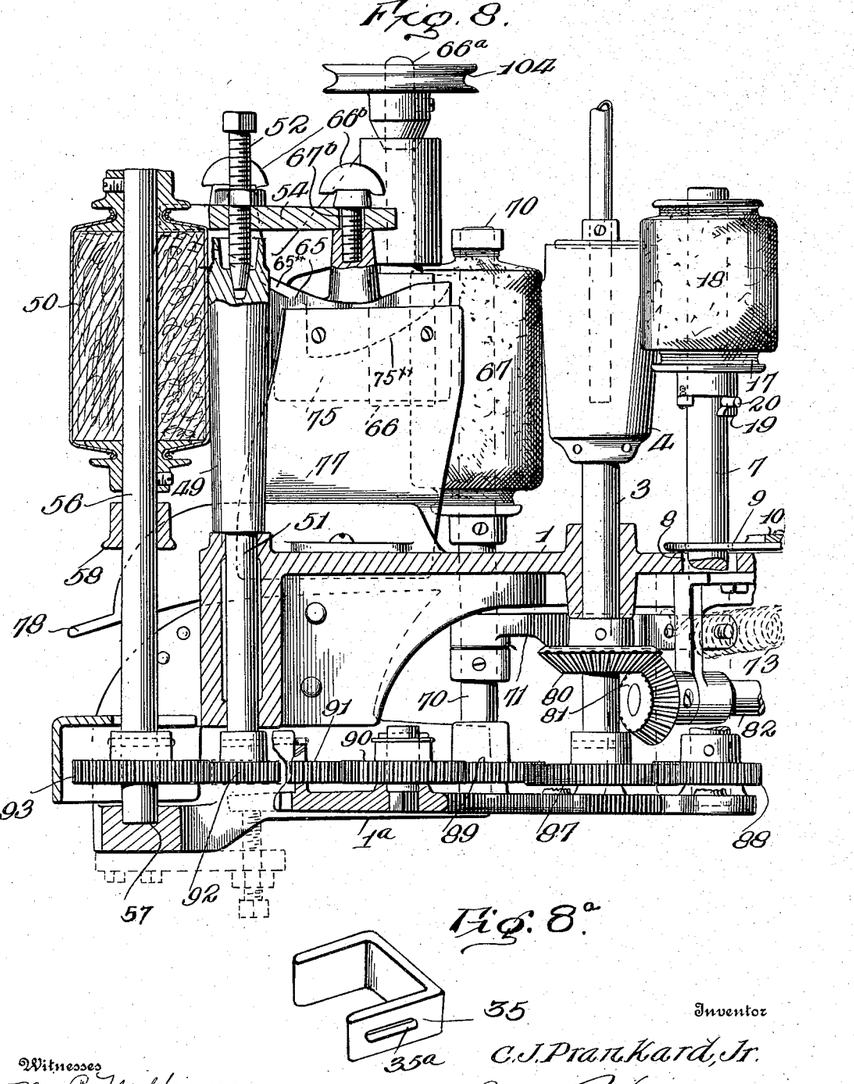
Figure 9:
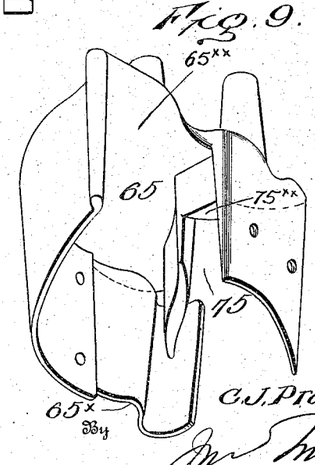
Fig. 9 is a detail underside perspective view of the guide adjacent the final folding mechanism.

Owing to the shape of the guiding chamber, the collar is permitted to curl between the time it leaves the rolls 4 and 17, and it reaches the reduced end 47, which very materially prevents buckling and high ends, owing to the fact that it assumes a natural position according to the curl given it by the first or preliminary curling rolls. But because of the converging chamber the collar is straightened out, so that by the time the two rolls 49 and 50, are reached, they will take hold of it in its natural condition and will further fold and curl the two bands. By the time the first two rolls 4 and 17, release their grip on the rear end of the collar the intermediate rolls are drawing it through the guiding chamber, and by their shape and speed, buckling and high ends are prevented. A guide 64, is fastened to the outside of member 42, and is adjustable toward and from the roll 49, and is curved somewhat to direct the collar toward said roll, and the roll 50. After the collar leaves the intermediate folding and curling rolls 49 and 50, it is brought into contact with a curved guide 65, the opposite end of which terminates at a point adjacent two final folding and curling rolls 66 and 67. The top of the curved guide 65 inclines from the rolls 49 and 50, as shown at 65$^{xx}$ to direct the end of the collar downwardly. The roll 66, is mounted on a shaft 66$^a$, in a bearing fastened to the curved guide 65, and the latter is fastened to the bracket 54 by means of set screws 66$^b$, operating in slots 67$^b$, in said bracket. The guide is provided with a bulged or projecting portion 65$^x$ which bears against the outside of the collar to create pressure enough to set the curl of the fabric during the period the collar is passing between rolls 66 and 67. The end of the curved guide 65, terminates adjacent roll 67, so as to deflect the end of the collar tangentially between said roll and roll 66. Roll 67, is mounted on a shaft 70, having a bearing in the supplemental frame 1$^a$ and an arm 71, pivoted at 72, under the bed-plate and connected to a spring 73. The object of this connection is to allow the roll 67, to be placed under tension, and to allow it to yield sufficiently to permit the outer band of the collar to travel slightly faster than the inner band to prevent buckling and high ends. The surface speed of the roller 67, is greater than the surface speed of the roll 66, and the diameter of roll 67 is greater and it is spring-pressed and padded, so that as the collar passes around the roll 66, it is given the desired shape. After the collar passes between the final folding and curling rolls it enters a channel or inclined guide 75, formed in the curved guide 65. The top of the guide 75 inclines from the rolls 66 and 67, as shown at 75$^{xx}$, to deflect the end of the collar downwardly. This channel terminates below the bottom of the plane of the body of the collar when the latter is passing between the intermediate and final folding rolls, as shown in Fig. 8. This guides the first end of collar below the end of roll 66 so that the collar is not again carried between rolls 66 and 67, and when the last end of the collar has passed rolls 66 and 67 the collar falls to the platform 78 and then slides off into a basket or box placed at the edge of the platform. This enables the operator to feed collars to the machine continuously without stopping to catch each collar as it comes from the machine. A plate guide 77, is secured to the guide 65, so as to prevent the ends of the collar contacting with the roll 49. The guide 77 also acts to curl the collar as it leaves the rolls 66 and 67. After the collar leaves the guide 77, it falls onto a platform 78, which is bent slightly downwardly to assist in throwing said collar from the machine.

On the shaft 3, is a beveled gear wheel 80, which meshes with a smaller beveled gear wheel 81, mounted on a shaft 82, supported in bearings on the bed-plate, and having on its outer end an enlarged gear wheel 83, meshing with a pinion 84, mounted on a stud shaft 85, connected to a band pulley 86, from which power is imparted to the mechanism. On the lower end of said shaft 3, is a gear wheel 87, which meshes with a smaller gear wheel 88, on the shaft 7. The shafts 3 and 7, are therefore revolved to feed the collar into the guiding chamber, shaft 7, carrying roller 17, being revolved faster than shaft 3, to feed the outer band faster than the inner band, and at the same time permitting said outer band to slip to prevent buckling and high ends. A gear wheel 89, meshes with the gear wheel 87, on shaft 70, and two intermediate gears 90 and 91, are located in the supplemental frame 1$^a$, gear 90 meshing with gear 89, and gear 91, meshing with a smaller gear 92, on the lower end of the shaft 51, to impart rapid motion to the roll carried thereby. Meshing with the aforesaid gear 92, is a larger gear 93, mounted on the shaft 56, carrying the roll 50.

A grooved pulley 94, revolving with the band pulley is engaged by a belt 95, which also engages a smaller grooved pulley 96, on a shaft 97, mounted in bearings on a standard 98, supported on the bed plate. Shaft 97, has secured to it a grooved pulley 99, smaller than the grooved pulley 96, and around it passes a belt 100, passing over a somewhat larger grooved pulley 101, on the upper end of the shaft 66$^a$, to impart motion to the roll 66.

The shaft 97, has mounted on it a sprocket wheel 102, and around the same passes a sprocket chain 103, also engaging a very much smaller sprocket wheel 104, on the end of the shaft 27, for imparting motion to the iron 26.

105 is a gas pipe having fork 106, the members of which are to be connected with supply pipes for gas and air. A branch extends from the pipe 105, and leads to the under side of the guiding chamber to supply gas to heat the guiding chamber. Another branch pipe 106ᵃ, leads to the hollow roll 4, to heat the same, and still another branch 107, leads to the hollow revolving iron 26, to heat it. By this arrangement of piping and suitable valves 108, the iron 26, the roll 4, and the guiding chamber 41, are all heated so as to iron the fold of the collar, and partly dry the collar before the intermediate folding rolls are reached.

In operation, a collar dampened at the edge of the seam is placed on the guide, with the bands bent downwardly and forced inwardly toward rolls 4 and 17. The outer band is deflected downwardly toward the inner band, and the tab contacts with roll 17, which carries it toward roll 4, until it is gripped by said two rolls. The iron is revolving rapidly in direction of arrow $b$, and the spring member is holding the band against the guide, which with the supplemental guide 39, serves to keep the ends of the collar close enough together to cause the preliminary rolls to take hold. As soon as the rolls 4 and 17, take hold of the collar, the latter is drawn into the guiding chamber. The roll 17, travels faster than roll 4, so as to carry the long outside band faster than the short inside band and so prevent the extra length of the outside band from gathering up and buckling and making the fold line run high on the last end. As the rolls are slightly tapered, obviously when they are forced apart by the collar, the pressure on the bands will not be as great at the bottom as at the top. Hence as the line of travel of the collar is in a curved path, coupled with the shape of the rolls the outer band readily slips and enters the guiding chamber with the two bands parallel. The shape of the guiding chamber is such that when the collar enters it, said collar can assume the curve given it by the preliminary rolls. As the collar progresses in the guiding chamber, it contacts with the deflector, and is forced toward the top, and is guided toward the small end 47, and is guided between the intermediate rolls 49 and 50. The reduced end of the guiding chamber straightens out the end of the collar to properly position it to be engaged by rolls 49 and 50. The collar is now caught by the intermediate rolls 49 and 50, before the opposite end is released from the preliminary rolls 4 and 17. The surface speed of roll 50 is faster than roll 49 which serves to assist the outer band to travel uniformly with the inner band. The collar is now directed into the curved guide 65, which directs the end to the final folding curling rollers 66 and 67. These two rolls act the same as the others, and as the collar leaves them it is directed into the channel 75, to bring the first part of the collar below the plane of the top of the band thereof, by pressing against the inclined guide. When the collar passes from the channel it is practically concentric to produce the desired set when worn.

Figures 10, 13:
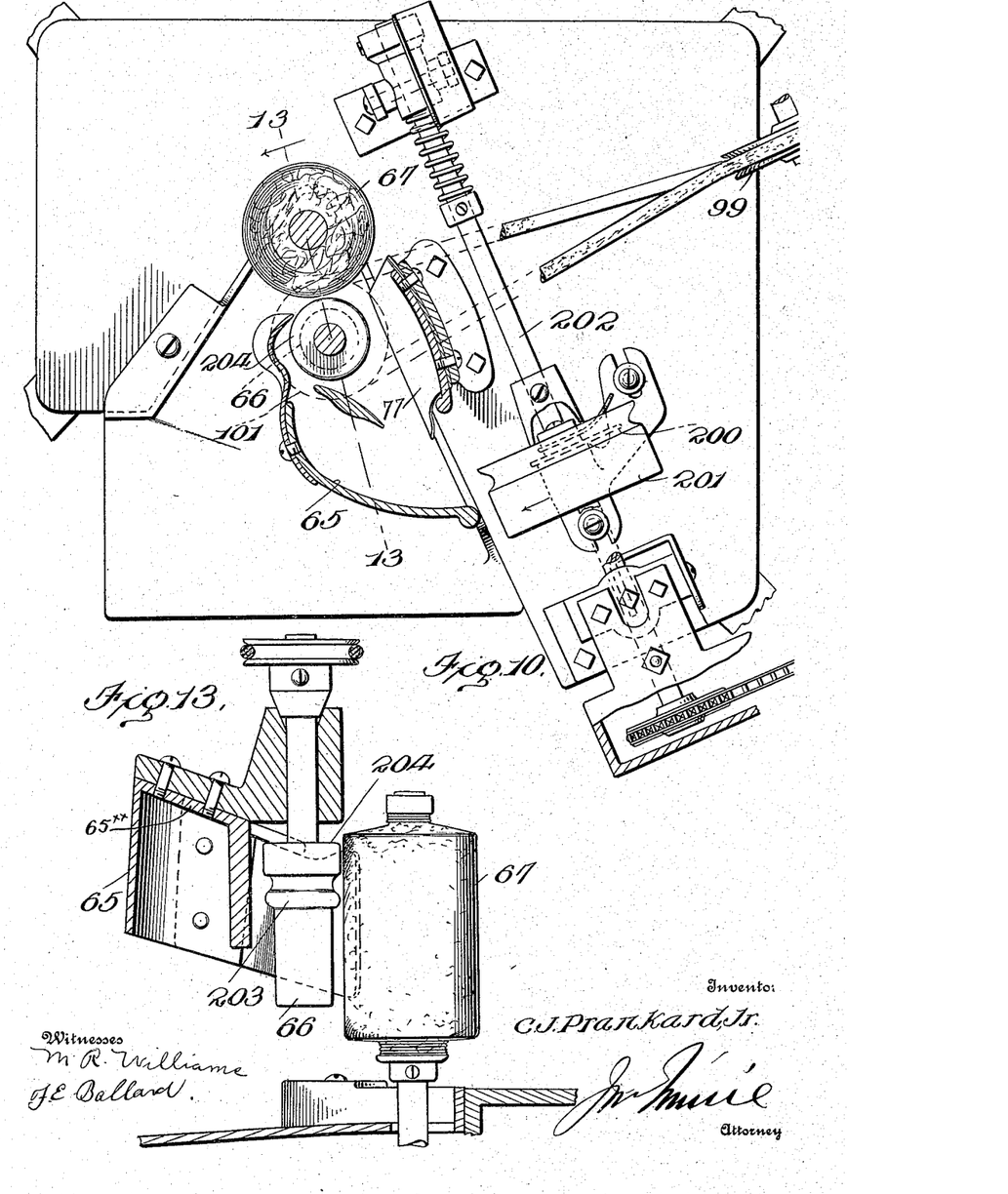
Figs. 10 and 11 are views of modified forms of my invention.
Fig. 13, is a section on line 13—13 of Figs. 7 and 10.

In Fig. 10, I have shown a slightly modified form of the invention, which comprises essentially the final curling mechanism, with an iron and guide opposite the entrance thereto. In this figure, 200, indicates a vertical guide, and 201, a heated revolving grooved iron, mounted on a shaft 202. The iron and guide operate in substantially the same manner as previously described in connection with the preferred form of the invention, except that instead of the collar being directed between the rolls it is directed into the guide or chamber 65. The guide 65, and rollers 66, and 67 are the same as previously referred to, except the roll 66 is provided with a slight bead 203, and an overhanging flange 204. The bead coöperates with the padded roller 67, to prevent too much pressure adjacent the top of the collar, and thereby avoid the impression of the seams of folds on the outer band. The flange 204 acts as an iron to give the collar top or fold an ironed finish. With this form of the invention I dispense with the guiding chamber and one set of folding rolls. The collar is placed on the guide under the revolving iron and forced through the guide 65, until the end is caught between the two rolls 66 and 67, when the latter will pull it through and with the channel and guide, fold and curl it.

Figures 11, 12:
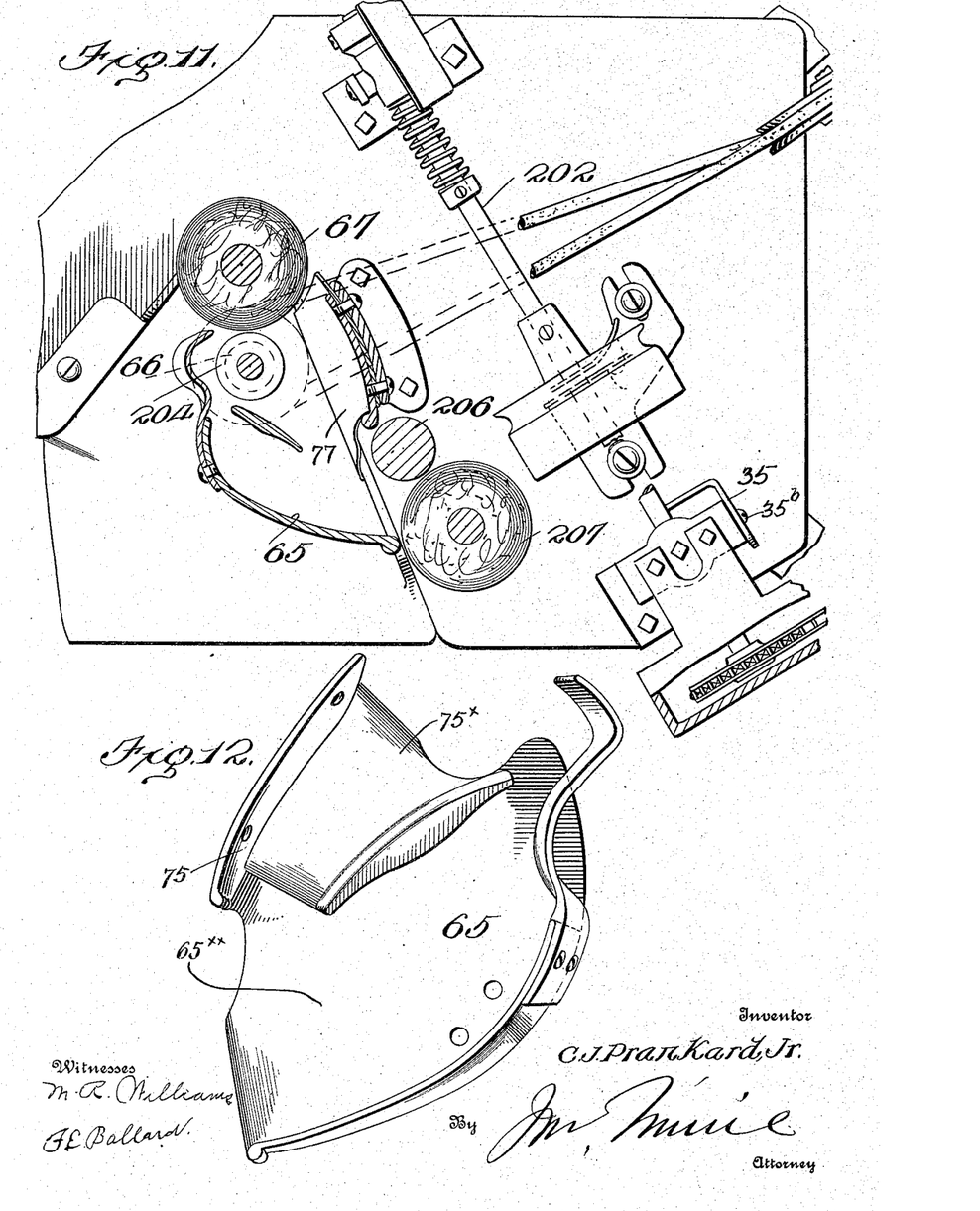
Fig. 12, is a detail bottom plan view of the guide shown in Fig. 9.

Obviously rolls 206 and 207 could be employed in connection with the construction shown in Fig. 10. These rolls are shown in Fig. 11, and when used it is not necessary to force the collar in the guide 65, as said rolls will carry it therein until rolls 66 and 67, take hold of it.

What I claim is:

1. In a collar folding and shaping machine, the combination with an iron, preliminary folding and shaping rolls, subsequent folding and shaping means, a guiding chamber interposed between the preliminary folding and shaping rolls and the subsequent folding and shaping means, said chamber being wider and deeper than a collar to permit the latter to curl vertically and horizontally, that portion of the preliminary folded collar which has passed the preliminary folding rolls being free in the chamber, a main guide in advance of the preliminary folding and shaping rolls, a spring member on one side of said guide, and a supplemental guide on the opposite side of said main guide and spaced therefrom.

2. In a collar folding and shaping machine, the combination with an iron, a pair of folding rolls, one of said rolls having a shoulder, the other said roll having its periphery padded, yielding means for normally pressing the padded roll against the shouldered roll, a main guide in advance of said rolls, a supplemental guide adjacent the main guide, a guiding chamber adjacent the rolls, said chamber being wider and deeper than a collar to permit the latter to curl vertically and horizontally, that portion of the collar which passes from between the aforesaid rolls being free in the guiding chamber, and means for drawing a collar from the guiding chamber before being released from said rolls.

3. In a collar folding machine, the combination with a vertically disposed main guide, an inclined supplemental guide spaced from the vertically disposed main guide, and located to one side thereof, a revolving iron provided with a groove to receive the edge of the vertically disposed main guide, a pair of folding rolls adjacent the guides, a guiding chamber adjacent the rolls, means for drawing a collar from the guiding chamber, and means including an inclined guide engaging the top of the fold of the collar for directing and turning the end of said collar downwardly below the portion of the band leaving the means which draw said collar from the guiding chamber.

4. In a collar folding and shaping machine, the combination with movable means for ironing the folded edge of a collar, means for folding and curling the collar, a chamber for allowing the collar to expand while being curled, means for further curling the collar, means pressing against the top of the fold of the collar located adjacent the last mentioned folding and curling means for directing the end of the folded and curled collar out of line with the plane of the top of the portion of the band thereof passing from said latter curling means, and a pair of rolls for drawing the collar from the means pressing against the top of the collar, said latter rolls being spaced from the last mentioned curling means.

5. In a collar folding and shaping machine, the combination with a vertically disposed guide, a revolving iron operating in conjunction with the edge of the vertically disposed guide, means permitting the revolving iron to be raised vertically upon the insertion of the collar between it and the guide, means permitting lateral movement of the revolving iron when a collar is inserted between the revolving iron and the upper edge of the guide, a pair of folding rolls adjacent the guide, a guiding chamber adjacent said rolls, said guiding chamber having a reduced end, means for heating the guiding chamber, and a pair of folding rolls located adjacent the reduced end of the guiding chamber.

6. In a collar folding and shaping machine, the combination with a vertically disposed guide, a revolving iron operating in conjunction with the edge of the vertically disposed guide, means permitting the revolving iron to be raised vertically upon the insertion of a collar between it and the guide, means permitting lateral movement of the revolving iron when a collar is inserted between the revolving iron and the upper edge of the guide, a pair of folding rolls adjacent the front end of the guide, a guiding chamber adjacent said rolls, said chamber having a reduced end, a pair of folding rolls located adjacent the reduced end of the guiding chamber, a pair of final folding and curling rolls spaced from the last two mentioned rolls, and a guide between the latter two sets of rolls.

7. In a collar folding and shaping machine, the combination with a vertically disposed guide, a revolving iron operating in conjunction with the edge of the vertically disposed guide, means permitting the revolving iron to be raised vertically upon the insertion of a collar between it and the guide, means permitting lateral movement of the revolving iron when a collar is inserted between the revolving iron and the upper edge of the guide, a pair of folding and curling rolls adjacent the guide, a guiding chamber adjacent said rolls, said chamber having a reduced end, a pair of folding and curling rolls located adjacent the reduced end of the guiding chamber, a pair of final folding and curling rolls spaced from the last two mentioned rolls, a guide between the latter two sets of rolls, and means for pressing against the top of the fold of a collar adjacent the final curling rolls for directing the end of the collar out of line with the plane of the top of the band.

8. In a collar folding and shaping machine, the combination with a pair of folding rolls, a guide located in advance of said rolls, a revolving iron having a groove in which the guide fits, a guiding chamber of greater width and depth than a collar to permit that portion which has passed between the folding rolls to be free and located adjacent the rolls, and a deflector in the guiding chamber to elevate the collar as it travels therethrough.

9. In a collar folding and shaping machine, the combination with a pair of folding rolls, a guide located in advance of one of said rolls, a revolving iron having a groove in which the guide fits, a guiding chamber, said guiding chamber being of greater width and depth than a collar to permit that portion of the latter passing between the pairs of folding rolls to be free to curl, said chamber being reduced in width at one end and located adjacent the rolls, a deflector in the guiding chamber to elevate the collar as it travels therethrough, and a pair of rolls adjacent the reduced end of the guiding chamber for drawing the collar from said guiding chamber before it is released from the first mentioned rolls.

10. In a collar folding and shaping machine, the combination with a revolving iron to iron the top of the fold of a collar, means for folding and preliminarily curling the collar, means for further curling the collar, including a roll which is next to the inside band of the collar, a chamber to permit the collar to expand between the time it is curled by the first means and the time it is curled by the second means, and guiding means engaging the top and side of the collar to direct the forward end of the collar below the bottom of that portion of the collar passing between the second mentioned curling means, and two rolls located beyond the latter curling means for drawing the collar from the collar directing means.

11. In a collar folding and shaping machine, the combination with means to iron the folded edge of a collar, means for folding and curling the collar, a guiding chamber, and a deflector in the guiding chamber to elevate the collar as it travels therethrough.

12. In a collar folding and shaping machine, the combination with means for ironing and smoothing the top of the fold of a collar, a pair of rolls which partly shapes the collar, a chamber to receive the collar to allow it to expand while in contact with the rolls, a second set of rolls at the end of the chamber which further shapes the collar, a guide adjacent the last mentioned rolls, a pair of rolls at the end of the latter guide, and means to guide the collar from the last mentioned pair of rolls.

13. In a collar ironing and shaping machine, the combination with ironing means, a pair of rolls adjacent the ironing means, a tapered guide adjacent the pair of rolls, said guide being of sufficient width to permit the collar to partially expand after leaving the pair of rolls, a pair of intermediate rolls at the opposite end of the tapered guide, the length of the guide being less than the length of a collar so that the intermediate rolls may take hold of the end of the collar before the opposite end is released by the first mentioned rolls, a curved guide adjacent the pair of intermediate rolls, said guide extending toward the first mentioned pair of rolls, a pair of final curling rolls adjacent the curved guide, and a guide adjacent the final curling rolls to deflect the forward end of the collar downwardly.

14. In a combined ironing and shaping machine, the combination of means for ironing a collar, means for preliminarily folding and curling a collar, a tapered chamber adjacent the preliminary folding and curling means, a pair of intermediate curling rolls adjacent the opposite end of the chamber, a curved guide adjacent the intermediate pair of curling rolls, a pair of final curling rolls adjacent the opposite end of the curved guide, and a guide having an inclined downwardly extended surface adjacent the final curling rolls to deflect the forward end of a collar downwardly.

15. In a collar folding and shaping machine, the combination with means for ironing and smoothing the top of the fold of a collar, a pair of rolls which partly shape the collar and which carry the collar forward, a second pair of rolls spaced from the first mentioned rolls which further shape and carry the collar forward while it is engaged by the first mentioned rolls, means to guide the collar from the first mentioned rolls to the last mentioned rolls, a third pair of rolls which further shape the collar and carry the same forward, means to guide the collar from the second pair of rolls to the third pair of rolls, and to guide the collar downwardly from the second mentioned set of rolls, and a guide against which the outer band of the collar contacts to further curl the collar.

16. In a collar folding and shaping machine, in combination with means for ironing and smoothing the top of the fold of a collar, folding and curling means including three pairs of rolls between which the collar passes to curl said collar, means to conduct the collar from the first pair of rolls to the second pair of rolls, and from the latter to the third set of rolls, and means pressing against the top of the fold of a collar for directing the first end of the collar out of line with the plane of the top of the band.

17. In a collar folding and shaping machine, in combination, means for ironing and smoothing the top of the fold of a collar, a pair of folding rolls yieldingly held together, a guiding chamber adjacent said rolls, a pair of rolls for drawing the collar from the guiding chamber, a guide adjacent the last mentioned rolls, a pair of rolls at the opposite end of the guide, and an inclined guide against which the fold of the collar bears to throw its free end downward.

18. In a collar folding and shaping machine, the combination with a vertically disposed main guide, a revolving iron provided with a groove to receive the edge of the vertically disposed main guide, means to heat the revolving iron, a pair of rolls which partly shape the collar and carry same forward, a second set of rolls spaced from the first set of rolls which further shape the collar, a guiding chamber interposed between the first and second mentioned sets of rolls, said guiding chamber being adapted to guide the collar from the first set of rolls to the second mentioned set of rolls, a pair of final rolls which further shape the collar, and means to guide the collar from the second set of rolls to the final set of rolls.

19. In a collar folding and shaping machine, the combination with means for ironing and smoothing the top of the fold of a collar, means for curling a collar, and an inclined guide greater in width than the thickness of a collar to allow the collar to expand and against which the top of the fold of the collar bears to throw its free end downward.

In testimony whereof I affix my signature in presence of two witnesses.

CHARLES J. PRANKARD, JR.

Witnesses:
CHARLES S. ALDRICH,
L. B. CLEXTON.

Copies of this patent may be obtained for five cents each, by addressing the "Commissioner of Patents, Washington, D. C."